United States Patent [19]
Kajiwara et al.

[11] Patent Number: 5,122,668
[45] Date of Patent: * Jun. 16, 1992

[54] INFRARED DETECTION ELEMENT

[75] Inventors: Teijiro Kajiwara; Hiroaki Yanagida, both of Tokyo; Masaru Miyayama; Norio Muto, both of Kanagawa, all of Japan

[73] Assignee: Sogo Keibi Hosho Kabushiki Kaisha, Tokyo, Japan

[*] Notice: The portion of the term of this patent subsequent to Jun. 18, 2008 has been disclaimed.

[21] Appl. No.: 398,415

[22] Filed: Aug. 25, 1989

[30] Foreign Application Priority Data

Sep. 7, 1988 [JP] Japan .................. 63-222506

[51] Int. Cl.⁵ ............................................. G01J 5/20
[52] U.S. Cl. ........................... 250/370.01; 338/18
[58] Field of Search ............ 250/370.01, 338.4, 338.1; 338/18

[56] References Cited

U.S. PATENT DOCUMENTS

| | | | |
|---|---|---|---|
| 3,106,692 | 10/1963 | McNaney | 338/18 |
| 3,504,181 | 3/1970 | Chi Chang et al. | 250/370.01 |
| 4,359,372 | 11/1982 | Nagai et al. | 338/22 R |
| 4,882,491 | 11/1989 | Tamura et al. | 250/338.3 |

Primary Examiner—Janice A. Howell
Assistant Examiner—Richard Hanig
Attorney, Agent, or Firm—Kinzer, Plyer, Dorn McEachran & Jambor

[57] ABSTRACT

In the present invention, semiconductor fibers electrical resistance of which varies in response to temperature change are arranged unidirectionally or bidirectionally, so that a detection element which has excellent response characteristic, can detect also a position of infrared source, and is inexpensive can be obtained.

9 Claims, 4 Drawing Sheets

INFRARED DETECTION ELEMENT

TECHNICAL FIELD

The present invention relates to an infrared detection element, and more particularly to an infrared detection element using a semiconductor fiber resistance of which varies in response to changes in temperature.

BACKGROUND OF THE INVENTION

As a conventional infrared detection element, these are one wherein a piezoelectric element utilizing piezoelectric effect is employed, one wherein a thermopile obtained by integrating thermocouples is employed, and the like ones. These infrared detection elements have been used widely, since they have the following characteristic features such as:

(a) Cooling is not necessary.
(b) There is no wavelength dependency in sensitivity.
(c) They can be manufactured inexpensively in comparison with the other elements.

However, since repsonse time of these infrared detection elements is slow, i.e. it ranges from several tens milliseconds to several hundreds milliseconds, they could not have been used for such applications which require quick speed of response. Furthermore, since these conventional elements can detect only one point by one element, there is a limit as to detection of a position of an infrared source by means of the elements combined, In addition, these elements are not satisfactory in view of cost.

SUMMARY OF THE INVENTION

Accordingly, an object of the present invention is to obtain an infrared detection element which has good response characteristic, can detect also a position of a infrared source, and is inexpensive.

In order to realize the above object, the infrared detection element according to the present invention is composed of a semiconductor fiber electrical resistance of which changes in response to temperature, and it is arranged in such that an amount of infrared rays is detected in response to changes in electrical resistance of the semiconductor fiber due to infrared irradiation.

It is another object of the invention to provide an infrared detection element which can effectively detect an amount of energy of the infrared rays irradiated by detecting a voltage variation appearing on the output terminals.

It is still another object of the invention to provide an infrared detection bridge circuit using the infrared detection element, whereby can detect highly sensitively an amount of infrared rays.

It is still another object of the invention to provide the infrared detection elements which can achieve a elevation of the detection sensitivity by increasing an amount of infrared rays received.

BRIEF DESCRIPTION OF THE DRAWINGS

Embodiments of the invention will now be described, by way of example, with reference to the accompanying drawings, in which.

DETAILED DESCRIPTION OF PREFERRED EMBODIMENTS

Figure 1:
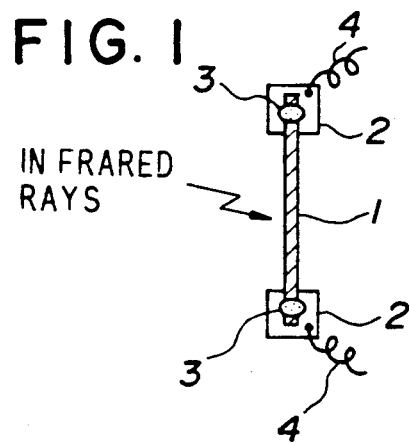
FIG. 1 is a constructional diagram showing the infrared detection element according to the first embodiment of the present invention.
Figure 2:
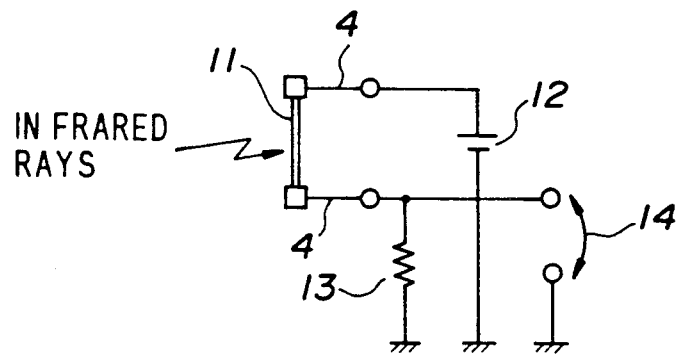
FIGS. 2-4 are circuit diagrams showing the first to third embodiments of the infrared detection circuits according to the present invention.

Embodiments of the present invention will be described hereinbelow in conjunction with the accompanying drawings. FIG. 1 illustrates the first embodiment of the infrared detection element according to the present invention wherein reference numeral 1 designates a semiconductor fiber made of, for example, silicon carbide and having a diaameter of about 15 μm to the opposite ends of which electrodes 2 are adhesive-bonded through a conductive adhesive 3 such as silver paste and the like. Reference numeral 4 designates lead wires for connecting the electrodes 2 to an electric circuit. FIG. 2 shows an infrared detection circuit using the infrared detection element 11 shown in FIG. 1 wherein a power source 12 and a resistor 13 are connected in series across lead wires 4 each connected to the opposite ends of the infrared detection element 11, and output terminals 14 are connected to the opposite ends of the resistor 13.

In the above construction, electric current flows from the power source 12 to the infrared detection element 11 and the resistor 13. In this condition, when infrared rays are irradiated onto the semiconductor fiber 1, temperature of the semiconductor fiber rises and the internal resistance of the semiconductor fiber 1 varies in response to temperatures. As a result, the electric current flowing through the series circuit comprising the infrared detection element 11 and the resistor 13 varies also, so that a voltage appearing on the output terminals 14 changes. Thus, when the voltage across the output terminals 14 is detected, an amount of energy of the infrared rays irradiated can be detected. In addition, since the semiconductor fiber is thin, the thermal capacity of which is small so that response of which becomes faster with respect to heat, and in turns, it can elevate speed of response for the detection of infrared rays. Furthermore, since silicon carbide having excellent corrosion resistance, heat resistance, oxidation resistance as well as high strength and flexibility is used as a semiconductor fiber 1 in the present invention, an infrared detection element having high stability and reliability can be obtained. Besides, since the semiconductor fiber 1 is comparatively inexpensive, an inexpensive infrared detection element can be obtained.

Figure 3:
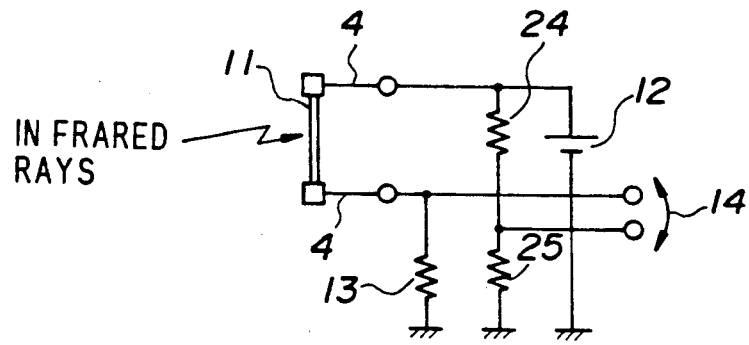
Figure 4:
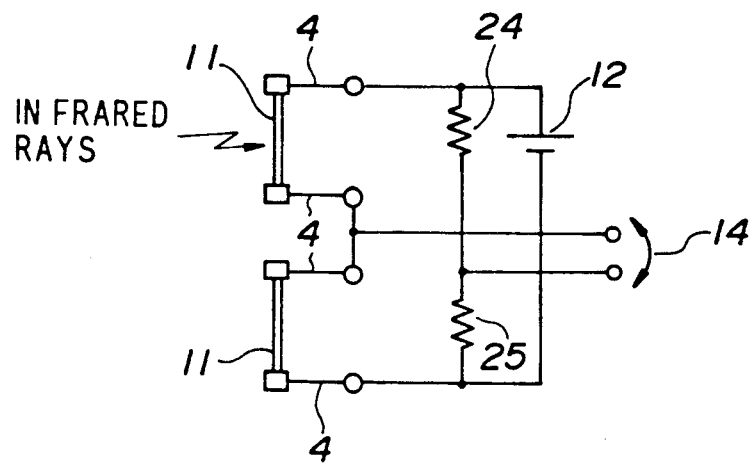

FIG. 3 shows the second embodiment of an infrared detection circuit using the infrared detection element 11. In this embodiment, a bridge circuit is composed of the infrared detection element 11 as well as resistors 13, 24 and 25, and the power source 12 and output terminals 14 are connected to the resulting bridge circuit, whereby changes in resistance in the infrared detection element 11 can be detected with favorable sensitivity and in turns, an amount of infrared rays can be detected highly sensitively. FIG. 4 shows the third embodiment of the infrared detection circuit according to the present invention wherein a bridge circuit is composed of two series-connected infrared detection elements 11 as well as resistors 24 and 25, and only either of the elements 11 in the bridge circuit is irradiated by infrared rays. In this connection, since the respective elements 11 have the identical temperature characteristics with each other, influence due to atmospheric temperature or self-heat generation is offset, so that an amount of infrared rays can be detected in favorable precision.

Figure 5:
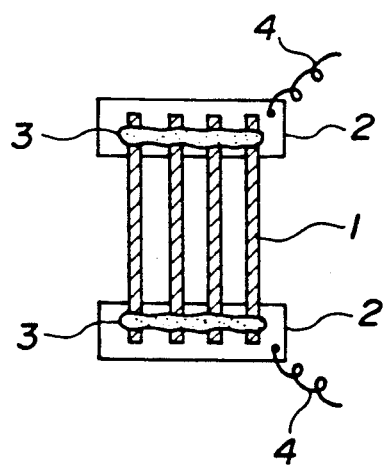
FIGS. 5-11 are constructional diagrams showing the infrared detection elements of the second to eighth embodiments of the present invention.
Figure 6:
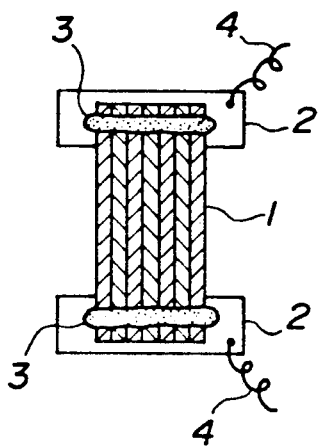

FIG. 5 shows the fourth embodiment of the infrared detection element according to the present invention wherein a plurality of semiconductor fibers 1 are connected in parallel to electrodes 2, whereby a synthesized impedance of all the elements becomes smaller, so that it makes possible to be hardly affected by noise or the like. Moreover, since an amount of infrared rays received increases, the detection sensitivity can be elevated FIG. 6 shows the fifth embodiment of the infrared detection element according to the present invention. While there has been each spacing between the semiconductor fibers 1, the respective semiconductor fibers 1 are arranged in parallel to each other with no spacing in this embodiment, so that an amount of infrared rays received per unit area increases, whereby the detecting sensitivity can be elevated.

Figure 7:
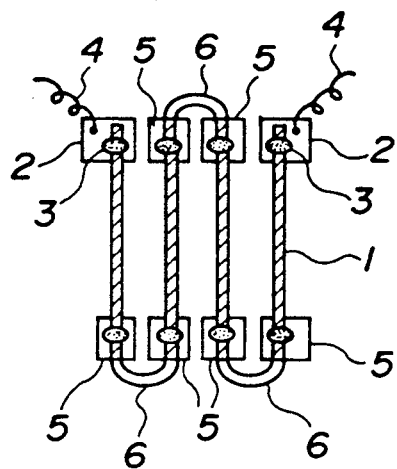

FIG. 7 shows the sixth embodiment of the infrared detection element according to the present invention wherein a plurality of semiconductor fibers 1 are arranged and these semiconductor fibers are connected in series through electrodes 5 and connecting wires 6, so that an amount of infrared rays received increases as well, whereby the detecting sensitivity can be improved. In connection with this embodiment, the connecting wire 6 may be made of the semiconductor fiber 1 and in such a case, the electrodes 5 can be omitted, whereby the construction of the infrared detection element can be simplified.

Figure 8:
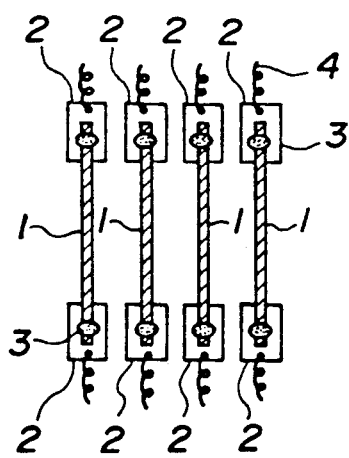

FIG. 8 shows the seventh embodiment of the infrared detection element according to the present invention wherein four of the infrared detection elements 11 shown in FIG. 1 are arranged so that temperature changes in the respective semiconductor fibers 1 can be individually detected, and as a result unidirectional distribution or infrared energy can be obtained. In the present embodiment, while one semiconductor fiber 1 is connected with respect to a pair of the electrodes 2, a plurality of semiconductor fibers each may be connected with a pair of the electrodes 2.

Figure 9:
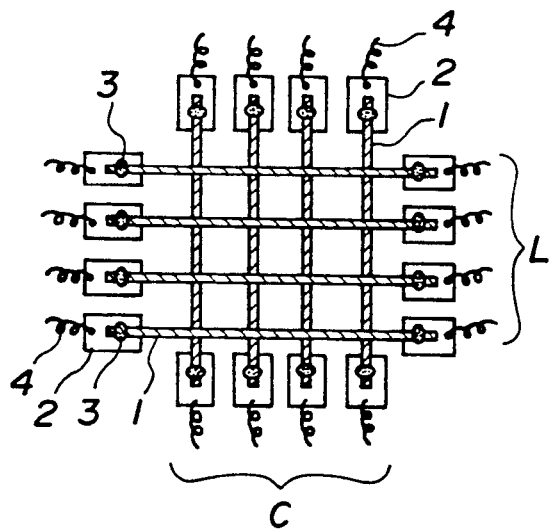

FIG. 9 shows the eighth embodiment of the infrared detection element according to this invention wherein the infrared detection components shown in FIG. 8 are arranged by crossing them at a right angle to each other as C and L. According to this construction, temperature changes due to infrared irradiation upon the respective semiconductor fibers 1 can be individually detected, whereby bidirectional distribution of infrared energy can be detected. In also this embodiment, a plurality of semiconductor fibers 1 each may be connected to a pair of the electrodes 2.

Figure 10:
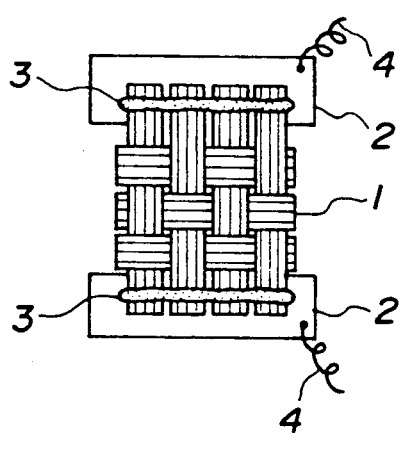

FIG. 10 shows the ninth embodiment of the infrared detection element according to the present invention wherein a plurality of semiconductor fibers each are woven crosswise to obtain a net-like element, whereby a mechanical strength of the element increases and handling therefore becomes convenient.

Figure 11:
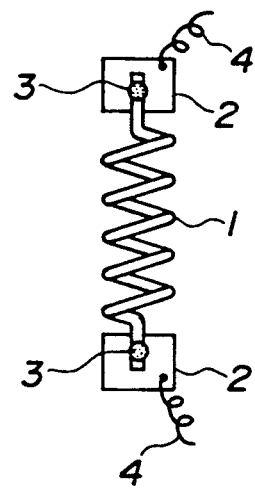

FIG. 11 shows a tenth embodiment of the infrared detection element according to the present invention wherein a coil-like element is fabricated from the semiconductor fibers 1, so that an amount of light received per unit area increases, whereby the sensitivity thereof can be elevated. In also the present embodiment, a plurality of the semiconductor fibers 1 may be connected with respect to a pair of the electrodes 2.

While silicon carbide has been used for a material of the semiconductor fiber 1 in the above described respective embodiments, it is to be noted that any material can be used so far as such material is the one by which changes in resistance due to changes in temperature can be detected.

As described above, since a thin semiconductor fiber is used in the present invention, an infrared detection element having small thermal capacity and quick response with respect to heat can be obtained according to the present invention.

Furthermore, when a plurality of thin semiconductor fibers are arranged, an amount of infrared rays received increases so that heat is efficiently absorbed, besides synthesized impedance can be reduced, whereby an infrared detection element having high sensitivity can be obtained.

Moreover, when a plurality of semiconductor fibers are arranged unidirectionally or bidirectionally and changes in resistance of the respective semiconductor fibers are detected, unidirectional or bidirectional distribution can be detected in respect of infrared energy, and as a result it becomes possible to detect a position of an infrared source.

In addition, since semiconductor fiber is inexpensive, an inexpensive infrared detection element is obtained.

Although the particular embodiments of the invention have been shown and described, it will occur to those with ordinary skill in the art that other modifications and embodiments exist as will fall within the true spirit and scope of the invention as set forth in the appending claims.

We claim:

1. An infrared detection element comprising a semiconductor fiber, the electrical resistance of which changes due to changes in temperature, and an amount of infrared rays being detected on the basis of the changes in electrical resistance of said semiconductor fiber upon irradiation of infrared rays.

2. An infrared detection element as claimed in claim 1 wherein said semiconductor fiber has a diameter of about 15 $\mu$m.

3. An infrared detection element as claimed in claim 1 wherein said semiconductor fiber is made from silicon carbide.

4. An infrared detection circuit comprising lead wires connected to the opposite ends of an infrared detection element composed of a semiconductor fiber the electrical resistance of which varies due to changes in temperature; a power source and a resistor connected in series to either end of the respective lead wires; and output terminals connected to the opposite ends of said resistor.

5. An infrared detection circuit as claimed in claim 4 wherein said infrared detection element constructs a bridge circuit together with the resistor connected in series to either end of said lead wire.

6. An infrared detection circuit as claimed in claim 5 wherein either of two substantially identical infrared detection elements connected to said bridge circuit is irradiated by infrared rays.

7. An infrared detection circuit comprising at least two semiconductor fibers, the electrical resistance of which changes due to changes in temperature, and a lead wire being connected to either end of the respective fibers.

8. An infrared detection circuit according to claim 7 wherein said at least two semiconductor fibers are arranged in parallel to each other.

9. An infrared detection circuit according to claim 7 wherein said at least two semiconductor fibers cross each other.

* * * * *